United States Patent Office 3,466,704
Patented Sept. 16, 1969

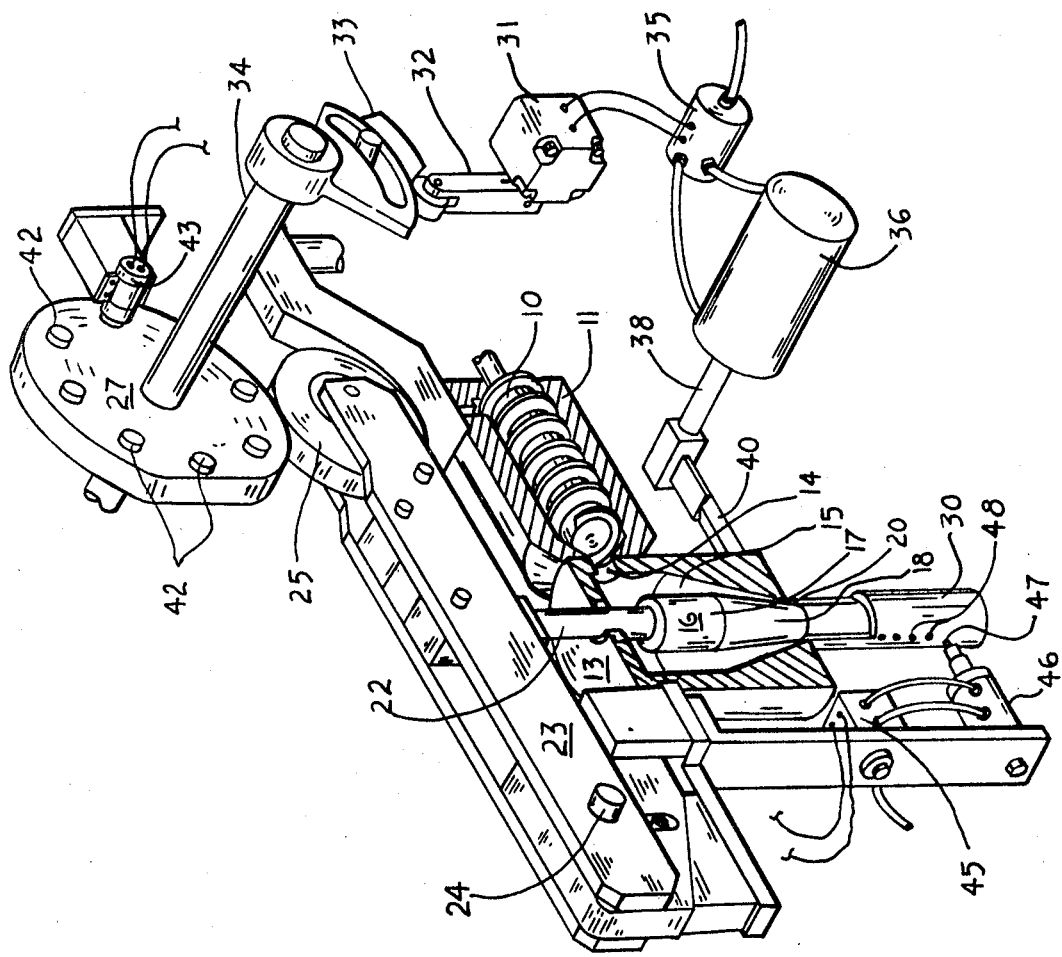

3,466,704
APPARATUS FOR PROGRAMMING PARISONS
Clement V. Fogelberg, Boulder, and Lowell H. Erickson, Denver, Colo., assignors to Ball Brothers Company Incorporated, Muncie, Ind., a corporation of Indiana
Filed Dec. 29, 1966, Ser. No. 610,211
Int. Cl. B29d 23/04
U.S. Cl. 18—14                                   6 Claims

ABSTRACT OF THE DISCLOSURE

Apparatus for marking parisons having axially variable wall thicknesses relative to the means for varying the wall thickness in order to determine which portion of the varying means cycle is associated with a flow in a blown article. A marking member movable into the parison is so moved by a number of indexing points on the varying means such as a cam.

---

This invention relates to a new and improved apparatus for forming hollow plastic articles, and more particularly relates to an improved apparatus for determining the proper programming of parisons to be blow molded into hollow plastic articles such as bottles or containers.

In forming hollow plastic articles by blow molding, a heated plastic parison or tube is surrounded by a hollow mold and expanded into conformity with the mold by injection of fluid within the parison. Hollow articles of many shapes may be formed by this approach. However, as will be readily recognized, articles on unusual configurations, such as square bottles, are not produced by an even expansion of the parison. Thus, wall thickness of such articles generally varies in a given cross section. While this condition in itself is not necessarily objectionable, failures do occur when "thin spots" occur as a result of the uneven expansion of the parison into conformity with the mold. "Thin spots" are avoided by providing a thicker parison wall in the portion of the parison which expands to the portion of the article tending towards "thin spotting."

Though, failure of hollow containers through "thin spotting" can be avoided by providing additional material or thickness in parison walls, this remedy is not as straight forward and simple as it may appear at first blush. Carried to the simplest conclusion, the parison would merely be made as thick as necessary to avoid "thin spots" in the walls of the blown article. However, material costs dictate that blow molded hollow articles weigh no more than absolutely necessary to provide the desired structural strength. For these reasons, parison programming apparatus such as that described in Fogelberg and Catlin, U.S. Patent 3,262,152 issued July 26, 1966, has been employed. In simple terms, such apparatus is merely a coordinated means for varying the size of the parison extrusion aperture thereby axially varying the thickness of the parison walls. By this means, material can be provided in the parison only in the areas thereof which tend to "thin spot" when the parison is expanded into conformity with the mold. Similarly, by observing the areas of structural failure, for instance, when blow-molded containers are stacked several tiers high, the area of weakness in the article can be determined and more material provided in the appropriate portion of the parison.

Surprisingly, though the parison programming apparatus has aided greatly in producing lightweight blow-molded articles of improved strength, it has been found that the more complicated article configurations do not readily respond to simple variations in parison programming. It has been discovered that the apparent relationship between the parison and the expanded article do not hold true for more complicated configurations. Material provided in a given portion of a parison does not expand into the expected portion of the article. Further, material inaccurately provided in an expanded article is wasteful, and may even detrimentally affect the structural strength of the article.

Thus, it is surprising that the relatively simple apparatus of the instant invention permitted parison programming which previously took days or weeks, or was even so difficult as to be impractical, to be accomplished in a superior manner in a matter of hours. Parison programming apparatus involves, in its simplest embodiment, adjustable means for varying the extrusion aperture and means for controlling such variance relative to the length of the extruded parison. A simple cam arrangement has been found to be one of the most practical and convenient means for varying the extrusion orifice. A detailed discussion of a particularly desirable arrangement may be found in the above-mentioned U.S. Patent 3,262,152. Other extrusion aperture varying means, as will be apparent to those skilled in the art, include reciprocating inclined planes or other cyclic means for producing linear movement. In the popular cam embodiment, the cam is coordinated with a switch which actuates a cutting knife which in turn determines the termination of one parison and the initiation of the following parison.

According to the instant invention, sensing means associated with the extrusion orifice varying means is connected to a marking means which observably marks the parison without substantially altering the structural properties of the parison. Thus, after the parison is expanded into the blow-molded article, the markings may be examined to determine which portion of the extrusion orifice varying means cycle is associated with a defect in the blown article.

Suitable sensing means include switches, both proximity and contact, photocells, and an interruptable light beam or a radioactive responsive cell and appropriate radioactive mass. Marking is advantageous by means of a colored wax crayon. The parison, of course, is at an elevated temperature when marked and therefore melts a small portion of the crayon upon contact. Solenoids, pneumatic or hydraulic cylinders, or direct mechanical linkage are examples of the numerous embodiments of the instant invention which will be apparent to those skilled in the art upon consideration of this discussion.

The apparatus of the instant invention will be more readily understood upon consideration of the drawing which is a simplified perspective view of the preferred apparatus of concern.

As will be noted from the drawing, a polymer-moving screw 10 in cylinder 11 communicates with the extrusion head 13 by means of passage 14. Extrusion head 13 includes chamber 15 and valve member 16 having a cylindrical portion 17 and a tapered portion 18. Tapered portion 18 of valve member 16 and the outlet of chamber 15 define extrusion orifice 20. Valve member 16 is movably mounted in extrusion head 13 by means of support arm 22. Support arm 22 is in turn slidably attached to movement arm 23 which is pivotably attached by pin 24 at one end and which carries roller cam follower 25 at the other end. Cam follower 25 is urged into contact with cam 27 by spring, hydraulic, or other biasing means not shown.

Thus, it will be recognized that as cam 27 rotates, cam follower 25 moves angularly relative to support pin 24, and thus produces angular movement of movement arm 23. This movement is transformed into linear motion by support arm 22, which in turn produces a variance in the size of extrusion orifice 20 by changing the relative position of tapered portion 18 of valve member 16 within chamber 15.

Variations in the size of the extrusion orifice 20, as described, are coordinated along the length of parison 30 by means of switch 31 having a trip arm 32 depending therefrom. Adjustable trip block 33 is connected to cam 27 by means of shaft 34. Thus, trip block 33 actuates trip arm 32 and switch 31, which in turn operates solenoid 35. Upon activation, solenoid 35 admits a fluid under pressure to piston and cylinder arrangement 36. Knife arm 38 is movable by the fluid and, when so moved carries knife 40 across extrusion orifice 20. Parison 30 is severed by knife 40 thereby terminating the extrusion of one parison and initiating extrusion of the following parison. It will be noted that the variations in extrusion orifice 30 and the movement of knife 40 are both dependent upon and coordinated with the rotation of cam 27. Therefore, reproducible programming is accomplished along the length of parison 30.

According to the instant invention, indexing means are provided on or coordinated with cam 27. In a preferred embodiment, indexing means are attached metal discs 42 circularly disposed upon cam 27. A proximity switch probe 43 is suported adjacent to cam 27 so that metal discs 42 may be sensed by probe 43 when passing. Proximity probe 43 is conected to switch 45 by means of wires only partially shown. Switch 45 activates marking solenoid 46 which carries marking piece 47. Thus, as each of the metal discs 42 passes proximity probe 43, marking head 47 is urged into contact with parison 30 thereby producing an indexing mark 48. Indexing mark 48 does not structurally alter parison 30 but remains observable when parison 30 is expanded into a blow-molded article. Defects in such an article can, by means of indexing mark 48, be traced to the appropriate metal disc 42. This permits determination of the portion of cam 27 associated with such defect. It is then a relatively simple matter to alter the contour of cam 27 and the resulting parison programming to remedy the defect.

From the above discussion, it will be apparent that the instant invention will permit not only expeditious determination of an optimum parison program for a new article, but also will facilitate a quick and accurate determination of possible programming problems should production articles be outside of specification. This latter employment of the invention would utilize a standby arrangement which would be used to mark parisons only when the need becomes evident.

It will of course be understood that the above description of the invention presupposed an expertise in the art involved and thus does not include a detailed discussion of the conventional aspects of the invention. Therefore, since it is apparent the various modifications in the apparatus described may be made within the scope of the invention, it is not intended that the invention be limited to the specific details described herein except as may be required by the following claims.

What is claimed is:

1. In parison programming apparatus comprising a variable-sized parison extrusion orifice, cutting means adjacent said orifice to sever parison lengths and means for varying the size of said extrusion orifice, the improvement comprising sensing means adapted to sense various preselected positions of said orifice varying means and marking means operably connected to said sensing means, said marking means being positioned below and offset from said extrusion orifice and adapted to briefly move into contact with parisons extruded from said orifice upon sensing of one of said preselected positions by said sensing means.

2. Apparatus as set forth in claim 1 wherein said orifice varying means is a cam and said preselected positions are index markings arranged to rotate as a function of the rotation of said cam.

3. Apparatus as set forth in claim 1 wherein said orifice varying means is a cam and said sensing means is a proximity switch disposed adjacent the plane of rotation of metal masses corresponding to said preselected positions and movably mounted to pass by said proximity switch as a function of the movement of said cam.

4. Apparatus as set forth in claim 1 wherein said marking means is a solenoid carrying a wax crayon whereby an impulse from said sensing means causes the plunger of said solenoid to move said crayon briefly into contact with the parison being extruded.

5. In a parison programming apparatus comprising a parison extrusion orifice defined by an outlet chamber and a movable valve member having a tapered portion, a rotatably mounted cam, a cam follower connected to said valve member, and a knife movably mounted adjacent said extrusion orifice, the improvement comprising cam indexing means coordinated to move with said cam, sensing means adapted to sense said cam indexing means, and marking means connected to said sensing means and movable upon sensing of said cam indexing means by said sensing means into the volume occupied by a parison extruded from said extrusion orifice.

6. Apparatus as set forth in claim 5 wherein said cam indexing means are metal discs, said sensing means is a proximity switch capable of activation by said metal discs, and said marking means is a solenoid connected to said proximity switch and carrying on the plunger portion thereof a wax crayon.

References Cited

UNITED STATES PATENTS

| | | |
|---|---|---|
| 3,002,615 | 10/1961 | Lemelson. |
| 3,241,185 | 3/1966 | Hufford. |
| 3,283,363 | 11/1966 | Turner. |
| 3,262,152 | 7/1966 | Fogelberg et al. |
| 3,368,241 | 2/1968 | Williams. |
| 3,396,219 | 8/1968 | Sutterfield et al. |

WILBUR L. McBAY, Primary Examiner

U.S. Cl. X.R.

18—2, 5; 264—40